United States Patent
Kim (10) Patent No.: US 7,006,577 B2
(45) Date of Patent: Feb. 28, 2006

(54) APPARATUS AND METHOD FOR DETECTING TRANSMISSION MODE IN DIGITAL AUDIO RECEIVER USING NULL SYMBOLS

(75) Inventor: Kwang-chul Kim, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 710 days.

(21) Appl. No.: 09/930,487

(22) Filed: Aug. 16, 2001

(65) Prior Publication Data

US 2002/0042661 A1    Apr. 11, 2002

(30) Foreign Application Priority Data

Aug. 16, 2000   (KR) ............................... 2000-47131

(51) Int. Cl.
  *H04K 1/10*     (2006.01)
  *H04L 27/28*    (2006.01)
  *H04L 7/00*     (2006.01)

(52) U.S. Cl. ...................... 375/260; 375/354; 375/355; 700/94

(58) Field of Classification Search ................ 327/31, 327/33, 34, 36, 58, 60, 72, 360, 38; 375/260, 375/354, 359, 360, 295, 316, 355; 370/208, 370/210; 700/94
See application file for complete search history.

(56) References Cited

U.S. PATENT DOCUMENTS

| | | | | |
|---|---|---|---|---|
| 4,507,795 A | * | 3/1985 | Wagner | 375/342 |
| 5,428,647 A | * | 6/1995 | Rasky et al. | 375/366 |
| 5,436,935 A | * | 7/1995 | Bernhard et al. | 375/367 |
| 5,822,384 A | * | 10/1998 | Thebault et al. | 375/367 |
| 6,381,251 B1 | * | 4/2002 | Sano et al. | 370/480 |
| 6,516,039 B1 | * | 2/2003 | Taura et al. | 375/354 |
| 6,549,589 B1 | * | 4/2003 | Tsuruoka | 375/343 |
| 6,731,702 B1 | * | 5/2004 | Nomura | 375/343 |
| 6,744,828 B1 | * | 6/2004 | Uchiyama et al. | 375/326 |
| 2003/0021363 A1 | * | 1/2003 | Lee | 375/340 |

FOREIGN PATENT DOCUMENTS

EP        0944194 A2 *  9/1999

* cited by examiner

*Primary Examiner*—Xu Mei
(74) *Attorney, Agent, or Firm*—Sughrue Mion, PLLC (57) ABSTRACT

An apparatus and method for detecting a transmission mode in digital audio receivers using the null symbol length which varies depending on the transmission mode. The transmission mode is determined by detecting the starting and end points of a null symbol. The starting point of the null symbol is determined as the point at which the mean square value of a received signal suddenly drops. After the starting point of the null symbol is detected, the mean square values of the signal are checked for and then the point with the maximum mean square value is determined as the end point of the null symbol. The null symbol length is calculated from the starting and end points of the null symbol. The transmission mode is estimated by comparing the calculated null symbol length with a predetermined range of null symbol length for each mode defined by the digital audio broadcasting scheme.

14 Claims, 6 Drawing Sheets

| | NULL SYMBOL LENGTH | FRAME LENGTH | RATIO OF FRAME LENGTH (BASED ON MODE 1) |
|---|---|---|---|
| MODE 1 | 2656T | 196,608T | 1 |
| MODE 2 | 664T | 49152T | 1/4 |
| MODE 3 | 345T | 49152T | 1/4 |
| MODE 4 | 1328T | 98304T | 1/2 |

APPARATUS AND METHOD FOR DETECTING TRANSMISSION MODE IN DIGITAL AUDIO RECEIVER USING NULL SYMBOLS

BACKGROUND OF THE INVENTION

1. Field of the Invention

The present invention relates to an apparatus and method for detecting a transmission mode in a digital audio receiver adopting an orthogonal frequency division multiplexing (OFDM) scheme for broadcasting, and more particularly, to an apparatus and method for detecting each transmission mode by detecting the starting and ending points of an OFDM signal. The present invention is based on Korean Patent Application No. 200-4731.

2. Description of the Related Art

Figure 1:
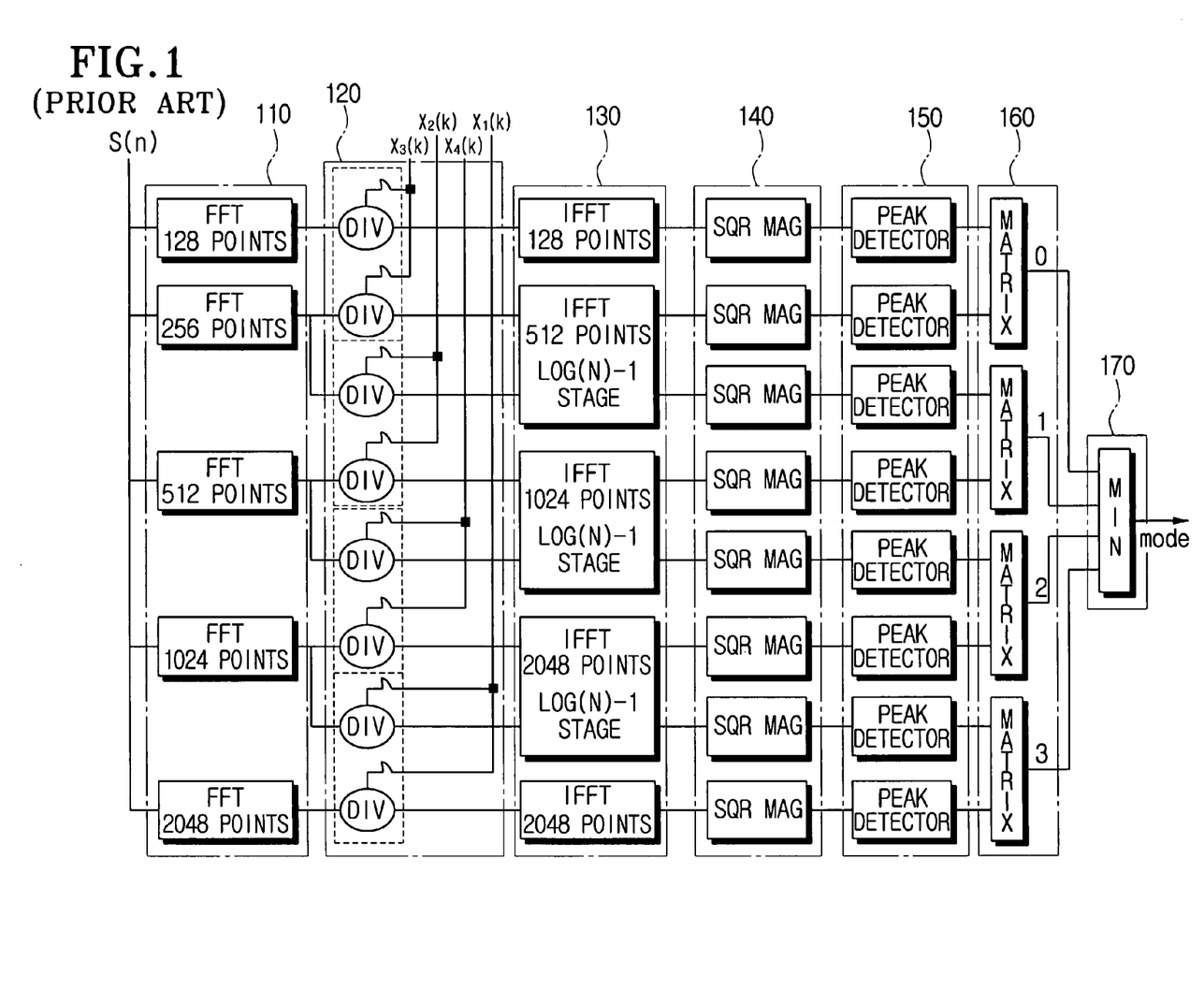
FIG. 1 is a block diagram of a conventional mode detection apparatus of a digital audio receiver.

Digital audio broadcasting systems (DAB) support four transmission modes, each of which is characterized according to the frequency band and broadcasting receiving region. The DAB transmits audio signals using an orthogonal frequency division multiplexing (OFDM) scheme. For the reception of audio signals, DAB receivers must detect first the mode of a transmission frame. U.S. Pat. No. 5,862,226, filed on 11 Feb. 1997 and issued to Stefano Cervini, discloses an automatic mode detection in digital audio receivers. FIG. 1 illustrates the configuration of the conventional mode detection apparatus. In the operation of the mode detection apparatus, as shown in FIG. 1, a Fast Fourier Transform (FIT) block 110 calculates the FFT on a received signal S(n) in parallel for each OFDM symbol length (for example, symbol lengths of 128, 256, 512, 1024 and 2048 samples). A division block 120 divides complex numbers output from the FFT block 110 by a corresponding OFDM symbol length. An inverse FFT (IFFT) block 130 executes the calculation of the IFFT on the signals output from the division block 120, according to a time decimation algorithm, of the type commonly referred to as "butterfly". A magnitude calculation block 140 calculates the magnitude of the numerical sequences output from the IFFT block 130. A peak value detection block 150 detects the peak value among the outputs from the magnitude calculation block 140, and stores the respective peak value for each numerical sequence in an N number of registers. A discrimination block 160 calculates the square of the calculation results of the IFFT module, relative to the numerical sequences corresponding to the different numbers of samples, detecting the peaks of the different numerical sequences resulting from the preceding calculation of the square and accumulating the relative peak values in an N number of registers, for each of the sequences. A minimum value estimation block 170 chooses a minimum value among the maximum values calculated in the discrimination block 160 and stored in the registers, and determines the transmission mode.

In the conventional mode detection apparatus and method, an input signal S(n) is subjected to as many parallel time-to-frequency domain transformations as the different numbers of samples, so that the calculation processes are complicated and the processing speed is delayed. In addition, the use of the FFT block complicates the configuration of the system. The conventional mode detection apparatus and method need additional registers for temporarily storing the IFFT results prior to comparisons of the IFFT results for calculating the correlations of each mode.

SUMMARY OF THE INVENTION

To solve the above problems, it is an objective of the present invention to provide an apparatus and method for detecting a transmission mode in digital audio receivers, in which the mode detection can be achieved within a short period of time through simplified calculation processes.

It is another objective of the present invention to provide an apparatus for detecting a transmission mode in digital audio receivers with simple configuration, and a mode detection method using the apparatus.

It is still another objective of the present invention to provide an apparatus and method for detecting a transmission mode in digital audio receivers, which does not need a time-to-frequency domain transformation.

It is still another objective of the present invention to provide an apparatus and method for detecting a transmission mode in OFDM receivers, in which the mode detection can be achieved within a short period of time through simplified calculation processes.

It is still another objective of the present invention to provide an apparatus for detecting a transmission mode in OFDM receivers with simple configuration, and a mode detection method using the apparatus.

It is still another objective of the present invention to provide an apparatus and method for detecting a transmission mode in OFDM receivers, which does not need a time-to-frequency domain transformation.

According to an aspect of the present invention, there is provided an apparatus for detecting a transmission mode in a digital audio receiver, comprising: a null symbol length calculation unit for calculating the null symbol length of each sample by detecting the starting and end points of the null symbol of each sample; and a mode determination unit for determining a transmission mode by comparing the null symbol length calculated by the null symbol length calculation unit with a predetermined range of the null symbol length for each mode.

Preferably, the apparatus for detecting a transmission mode in a digital audio receiver further comprises a square value calculation unit for calculating the square of the value of each sample of a received signal to detect the starting and end points of the null symbol of each sample.

Preferably, the null symbol length calculation unit comprises: a window buffer portion for storing the square values of the samples received for first or second search period in two window buffers having the same size; a mean square calculator for calculating the mean square of the samples stored in the two window buffers; a null symbol location detector for determining the starting point of a null symbol by detecting a minimum mean square value output from the mean square calculator for the first search period, outputting a search period control signal for changing the first search period to the second search period, and determining the end point of the null symbol by detecting a maximum mean square value from the mean square calculator for the second search period; and a step controller for changing the search periods for the window buffer portion and the mean square calculator from the first search period to the second search period, in response to the search period control signal output from the null symbol location detector.

Preferably, the size of each window buffer is equal to the data symbol length, i.e., 128T, for MODE 3 of the digital audio broadcasting scheme, which has the smallest data symbol length among the four modes.

Preferably, the first search period is equal to the frame length for MODE 1 of the digital audio broadcasting scheme, and the second search period is longer than the null symbol length for MODE 1 of the digital audio broadcasting scheme.

According to another aspect of the present invention, there is provided a method for detecting a transmission mode in a digital audio receiver, comprising the steps of: calculating the null symbol length of each sample by detecting the starting and end points of the null symbol of each sample; and determining a transmission mode by comparing the null symbol length calculated in the null symbol length calculation step with a predetermined range of the null symbol length for each mode.

Preferably, the method for detecting a transmission mode in a digital audio receiver further comprises the step of: calculating the square of the value of each sample of a received signal to detect the starting and end points of the null symbol of each sample.

Preferably, the null symbol length calculation step comprises the sub-steps of: (a1) calculating the mean square values for a first search period by dividing the sum of the square of each sample stored in a first window buffer by the sum of the square of each sample stored in a second window buffer, and determining the point with the minimum mean square value to be the starting point of a null symbol, wherein the samples stored in the first window buffer follow the samples stored in the second window buffer, and outputting a search period control signal for changing from the first search period to a second search period; (a2) in response to a search period control signal, calculating the mean square values for a second search period by dividing the sum of the square of each sample stored in the first window buffer by the sum of the square of each sample stored in the second window buffer, and determining the point with the maximum mean square value to be the end point of the null symbol, wherein the samples stored in the first window buffer follow the samples stored in the second window buffer; and (a3) calculating the null symbol length using the starting and end points of the null symbol detected in steps (a1) and (a2).

Preferably the transmission mode determining step comprises the substeps of: (b1) comparing the null symbol length calculated in step (a) with a first boundary value for mode determination; (b2) determining the current mode to be a first mode and terminating the mode determination if the condition of step (b1) is satisfied; (b3) comparing the calculated null symbol length with a second boundary value for mode determination if the condition of step (b1) is not satisfied; (b4) determining the current mode to be a second mode and terminating the mode determination if the condition of step (b3) is satisfied; (b5) comparing the calculated null symbol length with a third boundary value for mode determination if the condition of step (b3) is not satisfied; (b6) determining the current mode to be a third mode and terminating the mode determination if the condition of step (b5) is satisfied; and (b7) determining the current mode to be a fourth mode and terminating the mode determination.

Preferably, the first, second and third boundary values are set according to the null symbol length for each mode.

The first, second and third boundary values may be set so that the boundary values are in the order of increasing null symbol length for each mode.

According to an aspect of the present invention, an apparatus for detecting a transmission mode in an OFDM receiver comprises: a null symbol length calculation unit for calculating the null symbol length of each sample by detecting the starting and end points of the null symbol of each sample; and a mode determination unit for determining a transmission mode by comparing the null symbol length calculated by the null symbol length calculation unit with a predetermined range of the null symbol length for each mode.

A method for detecting a transmission mode in an OFDM receiver comprises the steps of: (a) calculating the null symbol length of each sample by detecting the starting and end points of the null symbol of each sample; and (b) determining a transmission mode by comparing the null symbol length calculated in step (a) with a predetermined range of the null symbol length for each mode.

The inventive apparatus and method for detecting a transmission mode in digital audio receivers does not need Fast Fourier Transform (FFT) and Inverse FFT (IFFT), and time-to-frequency domain transformation, so that the mode detection can be achieved through a relatively simple process, thereby improving the processing rate. The inventive mode detection apparatus adopts a simple configuration.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 2:
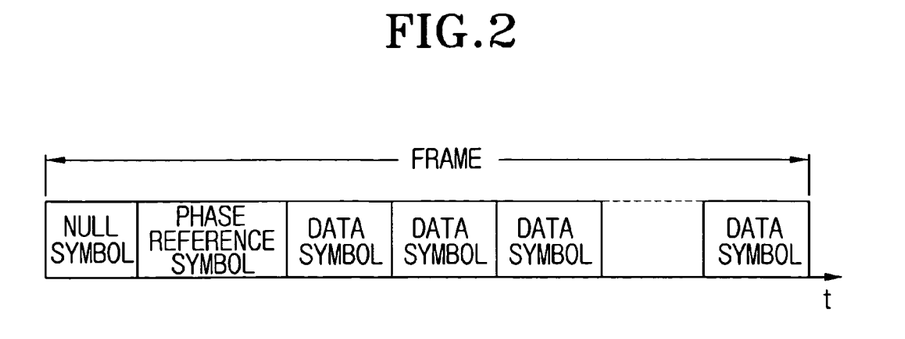
FIG. 2 illustrates the format of a digital audio broadcasting (DAB) frame.
Figure 3:
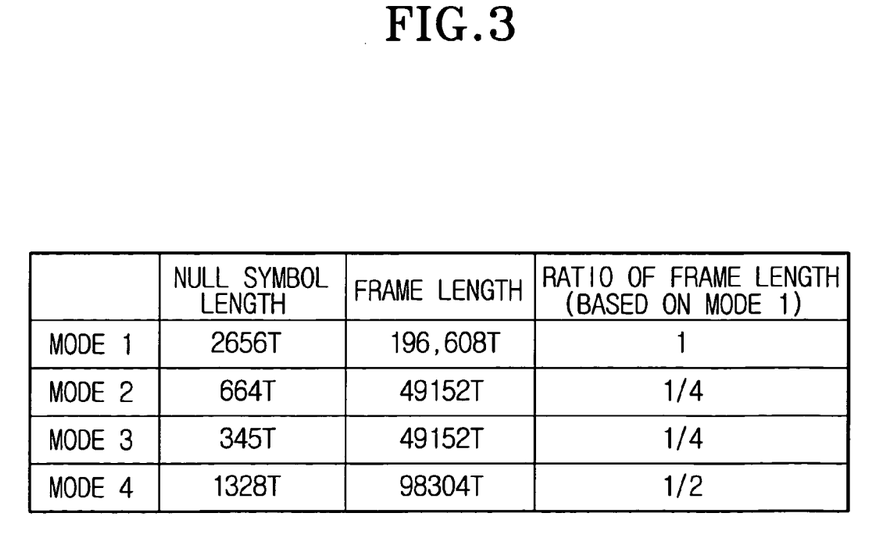
FIG. 3 illustrates the null symbol length and frame length for four transmission modes.

Digital audio broadcasting (DAB) signals are comprised of a plurality of frames and are transmitted using an orthogonal frequency division multiplexing (OFDM) scheme. As shown in FIG. 2, each frame includes two kinds of reference symbols and a predetermined number of data symbols. The first reference symbols are null symbols for frame synchronization and have zero magnitude. The second reference symbols are phase reference symbols. DAB systems support four transmission modes, each of which is characterized according to the frequency band and broadcasting receiving region. Each transmission mode has different frame lengths and null symbol lengths, as shown in FIG. 3. The frame lengths for the modes vary with a correlation with respect to the frame length for MODE 1. Also, null symbols appear at the leading end of every frame. In other words, the frames for the four modes have a matching point at the start end of each frame. Thus, the present invention determines a transmission mode by detecting the null symbol length based on the correlation of the frame lengths between the modes.

Figure 4:
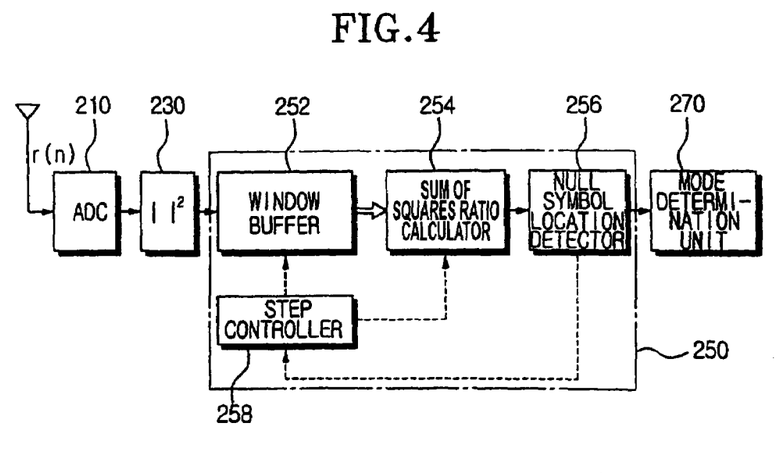
FIG. 4 is a block diagram of a mode detection apparatus in a digital audio receiver according to a preferred embodiment of the present invention.
Figure 5:
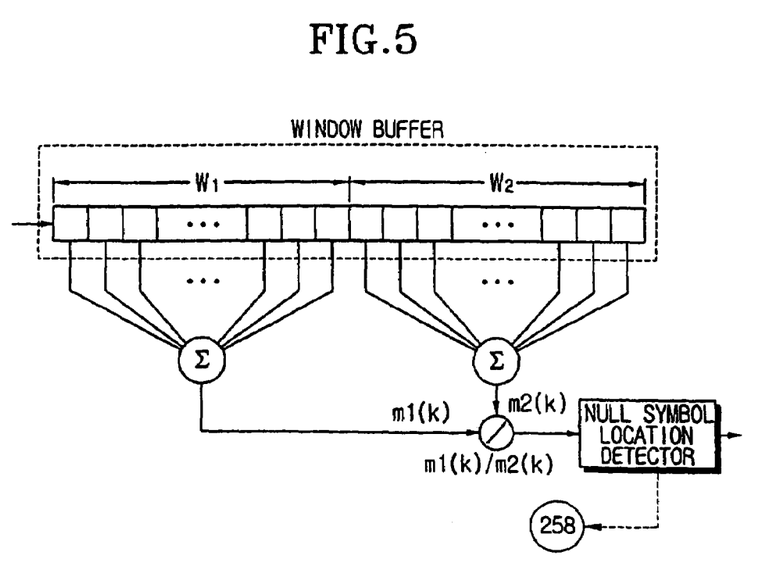
FIG. 5 illustrates the detection of the starting and end points of a null symbol of an orthogonal frequency division multiplexing (OFDM) signal in the mode detection apparatus of FIG. 4.

FIG. 4 is a block diagram of a preferred embodiment of a mode detection apparatus in a digital audio receiver according to the present invention. FIG. 5 illustrates the detection of the starting and end points of a null symbol of an orthogonal frequency division multiplexing (OFDM) signal in the mode detection apparatus of FIG. 4.

Referring to FIG. 4, the inventive mode detection apparatus includes an analog-to-digital converter (ADC) 210, a square value calculation unit 230, a null symbol length calculation unit 250 and a mode determination unit 270.

The ADC 210 converts a received analog signal r(n) to a digital signal, and the square value calculation unit 230 calculates the square of the value of each sample of the digital signal output from the ADC 210.

The null symbol length calculation unit 250 calculates the null symbol length of each sample by detecting the starting and end points of the null symbol of each sample using the square values calculated by the square value calculation unit 230.

The mode determination unit 270 determines a transmission mode by comparing the null symbol length calculated by the null symbol length calculation unit 250 with a predetermined range of the null symbol length for each mode.

In particular, the null symbol length determination unit 250 includes a window buffer portion 252, a sum of squares ratio calculator 254, a null symbol location detector 256, and a step controller 258.

The window buffer portion 252, which includes first and second window buffers W1 and W2 having the same size, as shown in FIG. 5, stores the square values of the samples received for first or second search period. The size of each of the window buffers W1 and W2 is determined to be 128T, which corresponds to the data symbol length for MODE 3 having the smallest data symbol length among the four modes.

The sum of squares ratio calculator 254 calculates the mean square of the samples stored in the two window buffers W1 and W2. In particular, the mean square value is calculated by dividing the sum m1(k) of the square of each sample stored in the first window buffer W1 by the sum m2(k) of the square of each sample stored in the second window buffer W2.

The null symbol location detector 256 determines the starting point of a null symbol by detecting a minimum square value output from the sum of squares ratio calculator 254 for the first search period, and determines the end point of the null symbol by detecting a maximum mean square value output from the sum of squares ratio calculator 254 for the second search period. Here, the null symbol location detector 256 outputs a search period control signal for changing one of the first and second search periods to the other search period.

Although in the present embodiment the starting point of a null symbol a minimum mean square value output from the sum of squares ratio calculator 254 for the first search period to be has been determined with the minimum mean square value, it will be apparent that if the sum of squares ratio calculator 254 calculates the mean square value by dividing m2(k) by m1(k), the starting and end points of a null symbol may be determined with the maximum and minimum mean square values, respectively.

The step controller 258 changes the search periods for the window buffer portion 252 and the sum of squares ratio calculator 254, i.e., from the first search period to the second search period, in response to the search period control signal output from the null symbol location detector 256. The first search period is determined to be equal to the frame length for MODE 1, which is the longest among the four modes. In order to reduce an error in mode determination, the second search period must be determined to be longer than the null symbol length for MODE 1, which is the longest among the four modes.

In the present embodiment, the second search period was determined to be 1.25 times longer than the null symbol length for MODE 1.

A preferred embodiment of a method for detecting a transmission mode in a digital audio receiver according to the present invention will be described with reference to FIG. 6.

First, a received analog signal r(n) is converted to a digital signal (step S110).

In step S130, the square of the value of each sample of the digital signal is calculated.

Next, the null symbol length of each sample is calculated by detecting the starting and end points Nstart and Nend of the null symbol of each sample using the square values calculated in step S130 (step S150).

In step S170, the null symbol length calculated in step S150 is compared with a predetermined range of the null symbol length for each mode, thereby determining a transmission mode.

In particular, the calculation of null symbol length (step S150) includes sub-steps S152, S154 and S156.

In sub-step S152, for the first search period(SP1), the sum m1(k) of the square of each sample stored in a window buffer is divided by the sum m2(k) of the square of each sample stored in a window buffer to calculate the mean square values, wherein the samples for the sum m1(k) follow the samples for the sum m2(k). The point with the minimum square value for the first search period(SP1) is determined to be the starting point Nstart of a null symbol.

When the detection of the starting point Nstart of the null symbol is completed in step S152, the first search period (SP1) is changed to the second search period(SP2) in response to a search period control signal.

Next, for the second search period (SP2), the sum m1(k) of the square of each sample stored in a window buffer is divided by the sum m2(k) of the square of each sample stored in a window buffer to calculate the mean square values, wherein the samples for the sum m1(k) follow the samples for the sum m2(k). The point with the maximum square value for the second search period(SP2) is determined to be the end point Nend of the null symbol (step S154).

Then, in step S156, the null symbol length(NL) is calculated using the starting and end points Nstart and Nend of the null symbol detected in steps S152 and S154.

Figure 6:
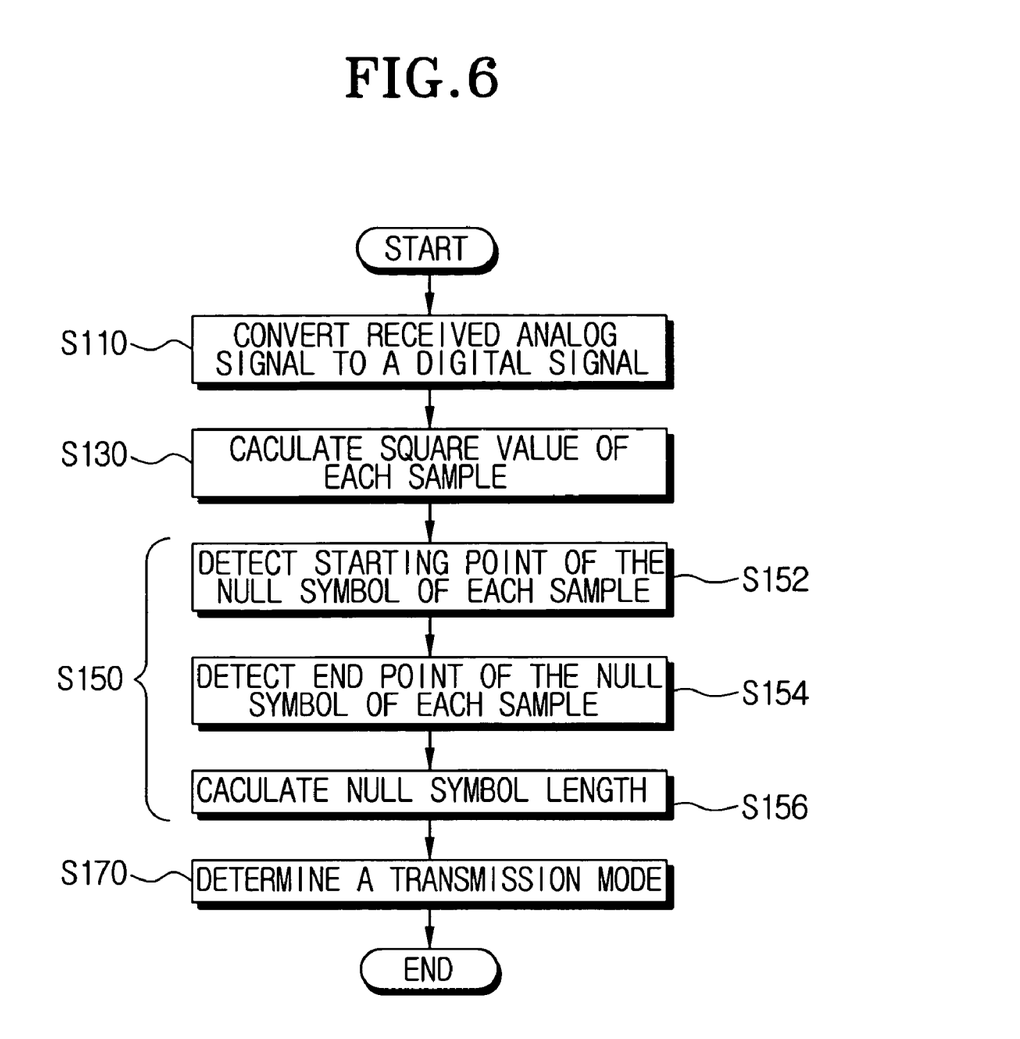
FIG. 6 is a flowchart illustrating a preferred embodiment of a method for detecting a transmission mode in a digital audio receiver according to the present invention.
Figure 7:
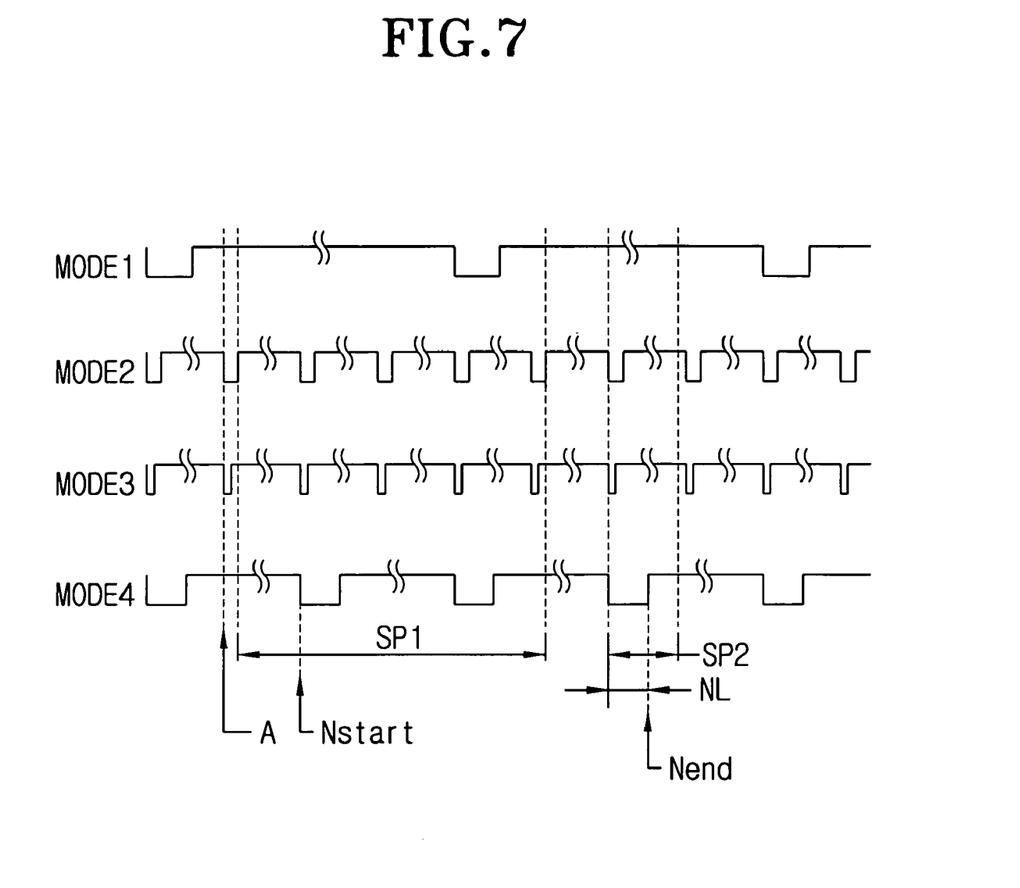
FIG. 7 is a timing diagram illustrating the null symbol length detection step of FIG. 6.

FIG. 7 is a timing diagram illustrating the null symbol length detection step of FIG. 6.

As shown in FIG. 7, as for MODE 4, the first search period(SP1) starts from the point A where the mode determination unit 270 is turned on. The number of symbols between the point A and the starting point Nstart of the null symbol corresponds to an offset, and the offset is used in detecting the end point Nend of the null symbol in step S154. In other words, when the first search period SP1 terminates, the number of symbols corresponding to the offset is counted to define the starting of the second search period SP2 from the starting point of a null symbol appearing after the first search period SP1.

Figure 8:
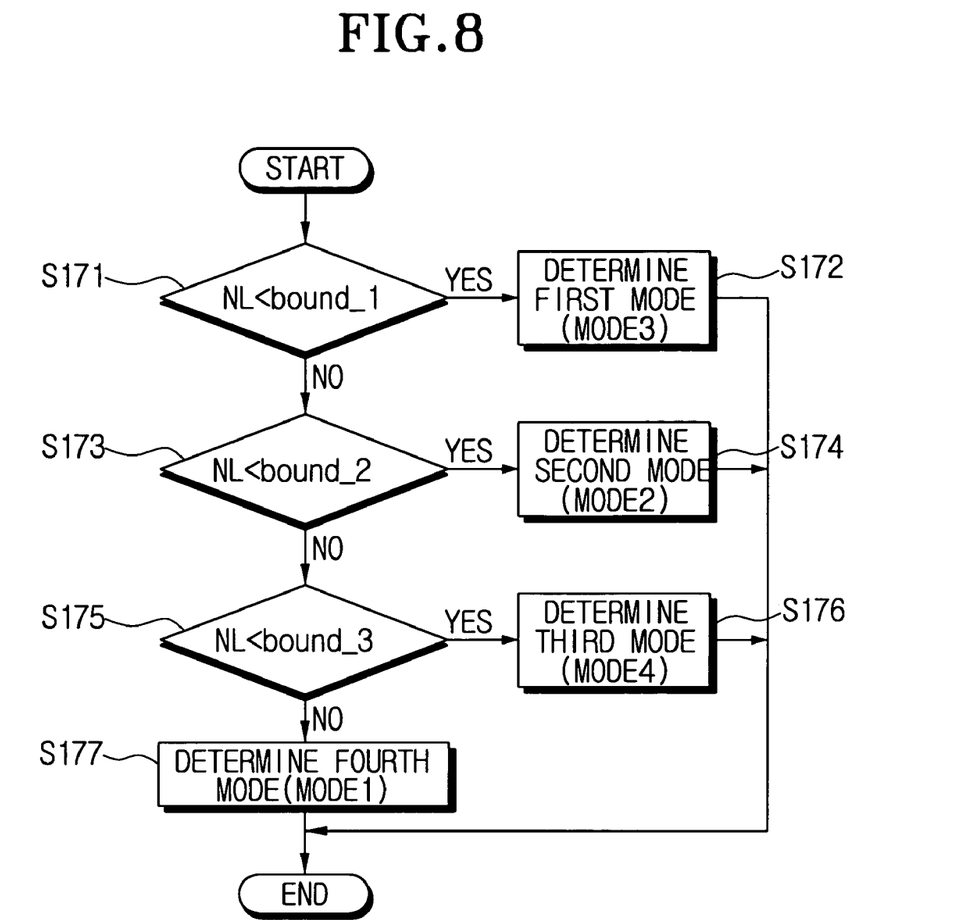
FIG. 8 is a flowchart illustrating in greater detail the mode determination step of FIG. 6.

The mode determination step (S170) includes the following sub-steps.

In first comparison step S171, the null symbol length (NL) from step S156 is compared with a first boundary value (bound_1) for mode determination.

If the condition of step S171 is satisfied, the current mode is determined to be a first mode and the mode determination is completed (step S172).

Otherwise, if the condition of step S171 is not satisfied, the null symbol length (NL) is compared with a second boundary value (bound_2) in step S173.

If the condition of step S173 is satisfied, the current mode is determined to be a second mode (step S240).

Otherwise, if the condition of step S173 is not satisfied, the null symbol length is compared with a third boundary value (bound_3) in step S175.

If the condition of step S175 is satisfied, the current mode is determined to be a third mode (step S176).

Otherwise, if the condition of step S175 is not satisfied, the current mode is determined to be a fourth mode (step S177).

The first, second and third boundary values (bound_1 bound_2 and bound_3) used in the mode determination (step S170) are set according to the null symbol length for each mode.

The first, second and third boundary values are set so that the boundary values are in the order of increasing null symbol length for each mode.

In the present embodiment, the first boundary value (bound_1) was set to 504T between the null symbol lengths for MODE 3 and MODE 2, the second boundary value (bound_2) was set to 996T between the null symbol lengths for MODE 2 and MODE 4, and the third boundary value (bound_3) was set to 1992T between the null symbol lengths for MODE 4 and MODE 1. Therefore, if the null symbol length NL is less than the first boundary value (bound_1) in step S171, the mode of a received signal is determined to be MODE 3. Otherwise, in step S173, a determination as to whether the null symbol length NL is less than the second boundary value (bound_2) is made. If yes, the mode of the received signal is determined to be MODE 2. Otherwise, in step S175, the null symbol length NL is compared with the third boundary value (bound_3). If the null symbol length NL is less than the third boundary value (bound_3), the mode of the received signal is determined to be MODE 4. Meanwhile, if the null symbol length NL is not less than the third boundary value (bound_3), the mode of the received signal is determined to be MODE 1.

As previously mentioned, the apparatus and method for detecting a transmission mode in a digital audio receiver and OFDM receiver according to the present invention does not require a time-to-frequency domain transformation, i.e., FFT and IFFT calculations, and thus the overall calculation process is simple, thereby improving the processing rate. In addition, the transmission mode detection apparatus according to the present invention has a simple configuration.

The apparatus and method for detecting a transmission mode according to the present invention can be applied not only to a digital audio receiver but also to an OFDM receiver.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An apparatus for detecting a transmission mode in a digital audio receiver, comprising:
    a null symbol length calculation unit for calculating a null symbol length of each frame by detecting the starting and end points of the null symbol of each frame by obtaining ratios of sums of squared symbol values; and
    a mode determination unit for determining a transmission mode by comparing the null symbol length calculated by the null symbol length calculation unit with a predetermined range of the null symbol length for each mode.

2. The apparatus of claim 1, wherein the null symbol length calculation unit comprises:
    a window buffer portion for storing the square values of the samples received for first or second search period in two window buffers having the same size;
    a sum of squares ratio calculator for calculating ratios of sums of first square values stored in a first of the two window buffers to respective sums of second square values stored in a second of the two window buffers;
    a null symbol location detector for determining the starting point of a null symbol by detecting a minimum ratio value output from the sum of squares ratio calculator for the first search period, outputting a search period control signal for changing the first search period to the second search period, and determining the end point of the null symbol by detecting a maximum ratio value from the sum of squares ratio calculator for the second search period; and
    a step controller for changing the search periods for the window buffer portion and the sum of squares ratio calculator from the first search period to the second search period, in response to the search period control signal output from the null symbol location detector.

3. The apparatus of claim 2, wherein the size of each window buffer is equal to the data symbol length for MODE 3 of the digital audio broadcasting scheme as defined in the present specification.

4. The apparatus of claim 2, wherein the first search period is equal to the frame length for MODE 1 of the digital audio broadcasting scheme as defined in the present specification.

5. The apparatus of claim 2, wherein the second search period is longer than the null symbol length for MODE 1 of the digital audio broadcasting scheme as defined in the present specification.

6. A method for detecting a transmission mode in a digital audio receiver, comprising the steps of:
    (a) calculating a null symbol length of each frame by detecting the starting and end points of the null symbol of each frame by obtaining ratios of sums of squared symbol values; and
    (b) determining a transmission mode by comparing the null symbol length calculated in step (a) with a predetermined range of the null symbol length for each mode.

7. The method of claim 6, wherein step (a) comprises the sub-steps of:
    (a1) calculating first ratios of square values for a first search period by dividing sums of first square values of each sample stored in a first window buffer by respective sums of second square values stored in a second window buffer, and determining a point with the minimum first ratio of square values to be the starting point of a null symbol, wherein the first square values samples stored in the first window buffer are squares of first samples and the second square values stored in the second window buffer are squares of second samples and the first samples follow the second samples, and outputting a search period control signal for changing from the first search period to a second search period;

(a2) in response to the search period control signal, calculating second ratios of square values for the second search period by dividing sums of third square values stored in the first window buffer by respective sums of fourth square values stored in the second window buffer, and determining a point with the maximum second ratio of square values to be the end point of the null symbol, wherein the third square values stored in the first window buffer are squares of third samples and the fourth square values stored in the second window buffer are squares of fourth samples and the third samples follow the fourth samples; and (a3) calculating the null symbol length using the starting and end points of the null symbol detected in steps (a1) and (a2).

8. The method of claim 7, wherein the first search period is equal to the frame length for MODE 1 of the digital audio broadcasting scheme, and the second search period is longer than the null symbol length for MODE 1 as defined in the present specification.

9. The method of claim 7, wherein step (b) comprises the sub-steps of:
(b1) comparing the null symbol length calculated in step (a) with a first boundary value for mode determination;
(b2) determining the current mode to be a first mode and terminating the mode determination if it is determined in step (b1) that the null symbol length calculated in step (a) is less than a first boundary value;
(b3) comparing the calculated null symbol length with a second boundary value for mode determination if it is determined in step (b1) that the null symbol length calculated in step (a) is not less than the first boundary value;
(b4) determining the current mode to be a second mode and terminating the mode determination if it is determined in step (b3) that the null symbol length calculated in step (a) is less than the second boundary value;
(b5) comparing the calculated null symbol length with a third boundary value for mode determination if it is determined in step (b3) that the null symbol length calculated in step (a) is not less than the second boundary value;
(b6) determining the current mode to be a third mode and terminating the mode determination if it is determined in step (b5) that the null symbol length calculated in step (a) is less than the third boundary value; and
(b7) determining the current mode to be a fourth mode and terminating the mode determination if it is determined in step (b5) that the null symbol length calculated in step (a) is not less than the third boundary value.

10. The method of claim 9, wherein the first, second and third boundary values are set according to the null symbol length for each mode.

11. The method of claim 10, wherein the first, second and third boundary values are respectively determined for each mode so that the boundary values are in the order of increasing null symbol length for each mode.

12. The method of claim 10, wherein the first boundary value is set to a value between the null symbol lengths for MODE 3 and MODE 2 of the digital audio broadcasting scheme as defined in the present specification, the second boundary value is set to a value between the null symbol lengths for MODE 2 and MODE 4 of the digital audio broadcasting scheme as defined in the present specification, and the third boundary value is set to a value between the null symbol lengths for MODE 4 and MODE 1 of the digital audio broadcasting scheme as defined in the present specification.

13. An apparatus for detecting a transmission mode in an OFDM receiver, comprising:
a null symbol length calculation unit for calculating a null symbol length of each frame by detecting the starting and end points of the null symbol of each frame by obtaining ratios of sums of squared symbol values; and
a mode determination unit for determining a transmission mode by comparing the null symbol length calculated by the null symbol length calculation unit with a predetermined range of the null symbol length for each mode.

14. A method for detecting a transmission mode in an OFDM receiver, comprising the steps of:
(a) calculating a null symbol length of each frame by detecting the starting and end points of the null symbol of each frame by obtaining ratios of sums of squared symbol values; and
(b) determining a transmission mode by comparing the null symbol length calculated in step (a) with a predetermined range of the null symbol length for each mode.

* * * * *